US009713803B2

(12) United States Patent
Hielscher et al.

(10) Patent No.: US 9,713,803 B2
(45) Date of Patent: Jul. 25, 2017

(54) METHOD AND DEVICE FOR CHANGING THE PROPERTIES OF AT LEAST ONE LIQUID MEDIUM

(75) Inventors: Harald Hielscher, Stahnsdorf (DE); Thomas Hielscher, Stahnsdorf (DE); Holger Hielscher, Teltow (DE)

(73) Assignee: DR. HIELSCHER GMBH, Teltow (DE)

( * ) Notice: Subject to any disclaimer, the term of this patent is extended or adjusted under 35 U.S.C. 154(b) by 640 days.

(21) Appl. No.: 14/131,691

(22) PCT Filed: Jul. 13, 2012

(86) PCT No.: PCT/EP2012/063772
§ 371 (c)(1),
(2), (4) Date: Jan. 9, 2014

(87) PCT Pub. No.: WO2013/007812
PCT Pub. Date: Jan. 17, 2013

(65) Prior Publication Data
US 2014/0150888 A1    Jun. 5, 2014

Related U.S. Application Data

(60) Provisional application No. 61/507,133, filed on Jul. 13, 2011.

(51) Int. Cl.
*B01J 19/10* (2006.01)
(52) U.S. Cl.
CPC ......... *B01J 19/10* (2013.01); *Y10T 137/0391* (2015.04); *Y10T 137/206* (2015.04)

(58) Field of Classification Search
CPC ......... B01D 21/283; B01D 43/00; C02F 1/52; C02F 1/36; B01J 19/10
See application file for complete search history.

(56) References Cited

U.S. PATENT DOCUMENTS

| | | | | |
|---|---|---|---|---|
| 4,075,095 A | * | 2/1978 | Parnaby | B01D 21/0012 210/112 |
| 4,695,305 A | | 9/1987 | Clasen | |
| 5,947,299 A | * | 9/1999 | Vazquez | B01D 21/0045 209/1 |
| 6,280,408 B1 | * | 8/2001 | Sipin | A61M 5/1483 604/65 |
| 6,322,488 B1 | * | 11/2001 | Westberg | A61M 1/38 494/39 |

(Continued)

FOREIGN PATENT DOCUMENTS

CH    430291    2/1967
WO    8501892   5/1985

*Primary Examiner* — Walter D Griffin
*Assistant Examiner* — Cameron Allen
(74) *Attorney, Agent, or Firm* — Fox Rothschild LLP

(57) ABSTRACT

Method and device for changing the properties of at least one liquid medium, in which method the liquid medium is exposed in at least one container to vibrations in the low-frequency power ultrasonic range and, to regulate the flow speed of the liquid material in the container in which the liquid medium is present for ultrasonic irradiation and/or to regulate the internal pressure of the container, the cross-section inside a line upstream of an inlet of the container in the direction of flow and/or downstream of an outlet of the container in the direction of flow is varied by means of at least one pinch valve.

8 Claims, 2 Drawing Sheets

(56) References Cited

U.S. PATENT DOCUMENTS

Figure 1:
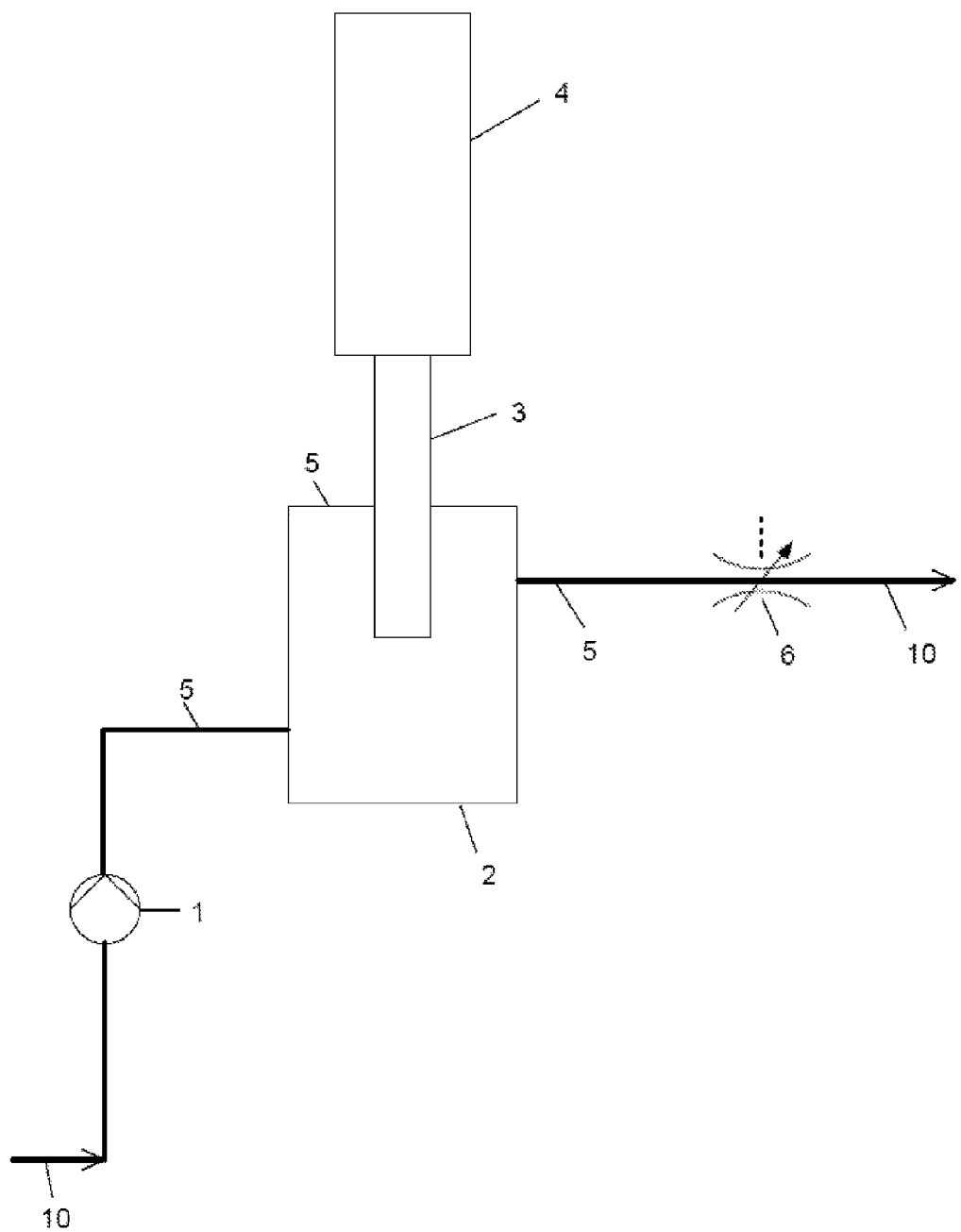

2002/0195402 A1     12/2002  Minter
2008/0116074 A1*     5/2008  Babaev ................ C02F 1/006
                                                      204/660
2011/0247987 A1*    10/2011  Triglavcanin ...... B01D 21/0024
                                                      210/741

* cited by examiner

METHOD AND DEVICE FOR CHANGING THE PROPERTIES OF AT LEAST ONE LIQUID MEDIUM

CROSS-REFERENCE TO RELATED APPLICATIONS

This application is a §371 national stage entry of International Application No. PCT/EP2012/063772, filed Jul. 13, 2012, which claims priority to U.S. Provisional Application No. 61/507,133, filed Jul. 13, 2011, which are hereby incorporated herein by reference in their entireties.

DESCRIPTION

The invention relates to an apparatus and a method for introducing low-frequency high-power ultrasonic oscillations (NFLUS oscillations) into liquid media under a pressure different from ambient pressure. The invention enables a simple and robust adjustment of a selected pressure and retaining this pressure. Low-frequency high-power ultrasound (NFLUS) is ultrasound with a working frequency of 15 to 100 kHz, preferably 15 to 60 kHz, for example, 20 kHz and an ultrasonic power above 5 W, preferably 10 W to 32,000 W, for example, 2000 W. For example, piezoelectric or magneto-restrictive systems are used to generate the ultrasound. Linear transducers and flat or curved plate resonators, flexural resonators or line resonators are known in the art. Low-frequency high-power ultrasound is frequently applied to treat flowable media (hereinafter collectively referred to as media) such as, for example, fluids, liquids, dispersions, emulsions, cell suspensions, pastes, paints and nanomaterials. These media may have different viscosities ranging from 0 cP to $3*10^{10}$ cP, preferably from 0.1 cP to $1*10^6$ cP. For the application of ultrasound, NFLUS is directly or indirectly transferred to media via a resonator with amplitudes from 1 to 350 μm, preferably 5 to 50 μm, e.g. 40 μm. Lambda is the wavelength resulting from the NFLUS frequency and sound propagation velocity in the resonator. A resonator may be composed of one or more Lambda/2 elements. A resonator constructed from several Lambda/2-Elements can be manufactured from a single piece of material of appropriate length, or from several elements of length n*Lambda/2 (n∈N), for example, by screwing, welding, adhesive bonding, or pressing. Lambda/2 elements may have various material cross-sectional geometries, for example, circular, oval or rectangular cross-sections. The cross-sectional geometry and cross-sectional area may vary along the longitudinal axis of a Lambda/2 element. Lambda/2 elements may be made, inter alia, of metallic or ceramic materials or of glass, in particular of titanium, titanium alloys, steel or steel alloys, aluminum or aluminum alloys, for example of titanium grade 5.

To introduce NFLUS into such vessel, oscillations can either be introduced in the vessel by an externally mounted NFLUS system or an NFLUS transducer can be installed in the pressurized vessel interior. Alternatively, the transducer, such as a linear piezoelectric transducer, may be located outside of the vessel, and the oscillations are transmitted into the vessel interior via one or more resonators.

To introduce NFLUS from outside a vessel, oscillations can be transmitted through vessel wall to the vessel contents. The oscillations may be transmitted to the vessel wall in a surrounding manner on all sides, over the entire vessel wall or over part of the vessel wall.

In many situations, media are conveyed continuously or at least partially continuously through the vessel system to process with NFLUS larger quantities than the volume the vessel is capable of holding. The media are hereby conveyed through the vessel, for example, by a pressure difference between the vessel inlet pressure and vessel outlet pressure. This pressure difference can be generated, inter alia, upstream of the inlet or downstream of the outlet or inside the vessel by using pumps, such as centrifugal pumps or positive displacement pumps, gear pumps, eccentric screw pumps, hose pumps, piston pumps or diaphragm pumps. Alternatively, a pressure, such as gas pressure, can be applied to the vessel system upstream of the inlet, or a lower pressure, for example a vacuum, can be applied to the vessel system downstream of the outlet. In addition, conveyance by a height gradient is possible.

When such a pressure difference exists between inlet and outlet, the medium can be moved through the vessel. For regulating the flow velocity and/or the internal pressure of the vessel, the line cross-section inside the vessel system upstream of the inlet and/or downstream of the outlet can be varied. Conventionally, valves are employed, e.g. ball valves, gate valves or rotary valves or needle valves. These can be operated, for example, manually, electrically, pneumatically or hydraulically. If the line cross-section is to be controlled as a function of an internal pressure measured in the system, then these valves require a regulating and control technology. This control may be implemented, for example, analog or digitally.

These employed valve systems have significant disadvantages when used with NFLUS.

NFLUS is a pressure-sensitive technology. The internal pressure of the vessel affects, for example, the transmission of NFLUS power, the hydrodynamic formation of cavitation and processes opposing the process target, e.g. during degassing. Fluctuations of the vessel pressure should therefore be largely minimized.

Fluctuations in the vessel pressure may be caused, inter alia, by variations in the composition of the medium, by fluctuations in the viscosity of the medium concomitant with changes in temperature, by thixotropy or rheopexy, by size changes of solids entrained in the medium or by a variable volume flow of the feed pump.

It is therefore the object of the invention to provide a method and a device which enables changes in at least one property of a liquid medium in a simple manner and with very little effort.

According to the invention, the object is attained by the features of the methods and devices as described herein. In one example, a method for changing a property of at least one liquid medium includes exposing the at least one liquid medium contained in at least one vessel to ultrasonic oscillations in a low-frequency high-power ultrasound range, and regulating at least one of a flow velocity of the at least one liquid medium in the at least one vessel in which the at least one liquid medium is contained for exposure to ultrasound and an internal pressure of the at least one vessel by varying with at least one pinch valve a cross-section of at least one of a line located upstream of an inlet of the at least one vessel in a flow direction and a line located downstream of an outlet of the at least one vessel, wherein the at least one pinch valve is pneumatically or hydraulically controlled and a constant control pressure is applied to the at least one pinch valve.

According to the invention, a method for changing a property of at least one liquid medium is provided, wherein the liquid medium in at least one vessel is exposed to oscillations in a low-frequency high-power ultrasound range. For regulating the flow velocity of the liquid medium in the vessel in which the liquid medium resides for the purpose of exposure to ultrasound, and/or for regulating the internal pressure of the vessel, the cross-section of a line located upstream of an inlet of the vessel in the flow direction and/or located downstream of an outlet of the vessel is varied by at least one pinch valve.

The line may also include one or more additional vessels located upstream or downstream of the vessel that is exposed to the ultrasound. Optionally, a plurality of pinch valves may be arranged sequentially in the flow direction. When a pinch valve is arranged directly at an inlet or an outlet, the pinch valve forms this inlet or outlet. In other words, the line in this section is formed by the pinch valve itself.

The pinch valves can keep fluctuations of the internal vessel pressure extremely low or even prevent fluctuations.

Preferably, the exposure to ultrasound takes place a pressure in the liquid medium that is different from the ambient pressure.

A pinch valve may have a round or elliptical body, and a highly elastic hollow cylinder or another hollow body inside the housing, which has flanges at both ends for connection.

Typically, a cavity exists between the housing and the hollow cylinder, or such a cavity can be created by applying pressure.

By increasing the pressure in the cavity by supplying gas or liquid into the hose pinch valve housing, the hollow cylinder can deform in such a way that its internal cross-section is reduced or even closed off. This allows a reduction of a volume flow through the pinch valve. When the overpressure in the cavity is released, the hollow cylinder can elastically recover until achieving full passage through the pinch valve.

The pinch valve can be controlled pneumatically or hydraulically or electrically, or by at least one spring element.

With pneumatic or hydraulic control, or with control by at least one spring element, a preferably constant control pressure is applied to the pinch valve.

Advantageously, the cross-section is varied with the pinch valve during ultrasonic operation.

The line cross-section can be varied as a function of ultrasonic parameters, for example the ultrasonic power.

The liquid medium may be exposed to ultrasound having a frequency between 15 and 40 kHz, preferably a frequency of between 16 and 22 kHz.

Also, the liquid medium may be exposed to ultrasound with a power between of 50 W and 20,000 W, preferably a power between 500 and 16,000 W.

The liquid medium may be exposed to ultrasound with a maximum amplitude of the ultrasonic oscillations greater than 1 µm (peak-peak).

In particular, the amplitude may be greater than 10 µm (peak-peak), and preferably greater than 30 µm (peak-peak).

The internal vessel pressure may be lower or higher than the ambient pressure, for example in the range form 0 to 10 bar. Particular, the internal vessel pressure may be 1 to 5 bar above the ambient pressure.

The property of the medium to be changed may also be its temperature, wherein the heating caused by the ultrasound treatment is optionally compensated by a preceding or subsequent cooling.

The method may further be configured such that at least a portion of the medium whose properties were at least temporarily changed by ultrasound treatment is returned via the outlet back to the inlet, so that the treatment of the medium is carried out in a closed loop.

To attain the object, a device for changing the properties of at least one liquid medium is furthermore provided, which includes at least one vessel for receiving the liquid medium and a device for transmitting low-frequency high-power ultrasound to the liquid medium in the vessel. The device for changing the properties further includes a line located upstream of an inlet of the vessel in the flow direction and/or a line located downstream of an outlet of the vessel, wherein at least one pinch valve for regulating the flow rate of the liquid medium in the vessel in which the liquid medium resides for the purpose of exposure to ultrasound and/or for regulating of the internal pressure of the vessel is arranged on or in at least one of these lines.

Preferably, a pinch valve is located downstream of the vessel, or upstream and downstream of the vessel.

The pinch valve can be configured to completely close off the respective line.

The device according to the invention for changing the properties further includes preferably a control device configured to control the reduction of the line cross-section through the pinch valve as a function of at least one ultrasonic parameter, such as the ultrasonic power.

Depending on the application, the medium in the vessel may be at a lower pressure or a higher pressure than the ambient pressure. A lower pressure (reduced pressure) is between vacuum (0 bar absolute) and ambient pressure (e.g. 1 bar absolute), for example 0.5 bar. A higher pressure (overpressure) is present when the pressure is above the ambient pressure. For example, an internal vessel pressure between 1.5 bar absolute and 1000 bar absolute, preferably between 2 bar and 40 bar, e.g. 4 bar absolute, can be set.

By using in the present invention a pinch valve at the vessel inlet and/or at the vessel outlet, fluctuations of the internal vessel pressure can be minimized in a simple way and with very low control overhead or even entirely prevented. Preferably, a pinch valve is used for reducing the control overhead, wherein the pinch valve generates the required counterpressure pneumatically, hydraulically, electromechanically or with a spring element, preferably pneumatically or hydraulically, for example pneumatically.

The advantage of using such a pinch valve in comparison with conventional pressure control techniques lies in the immediate response of the interior valve cross-section to changes of the media pressure applied to the valve. In this way, fluctuations of the internal vessel pressure, for example caused by variations in media composition or by a pulsating volume flow of the pump conveying the media can be minimized. Clogging caused by deposited or accumulated solids at the reduced line cross-section of the valve can be prevented by an appropriate design of the pinch valve with a flexible inner wall material. The inventive use of a pinch valve results in more continuous ultrasound conditions inside the vessel. The process conditions and the process results of the pressure-sensitive ultrasound technology can thereby be better controlled.

Figure 2:
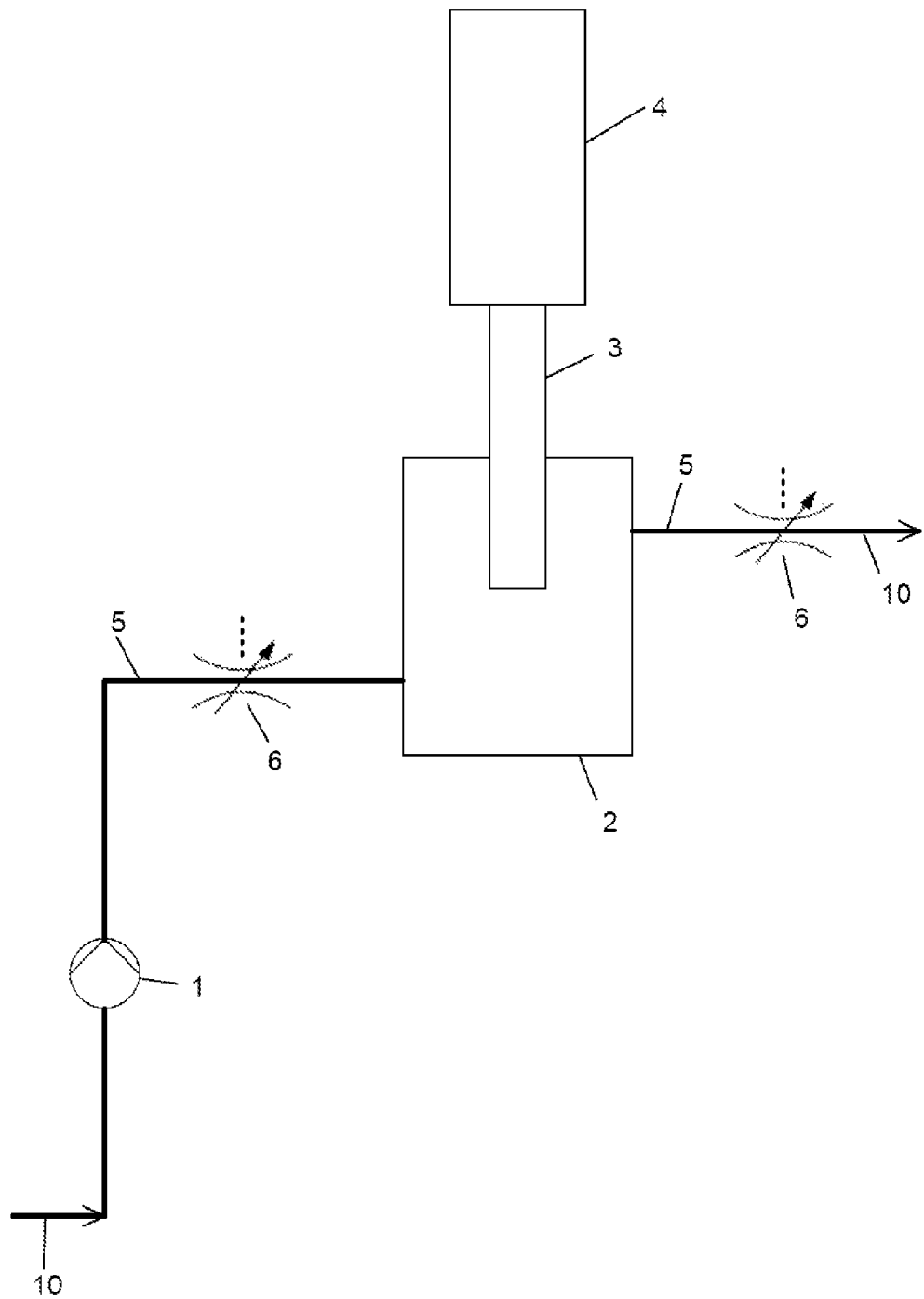

The invention will now be explained below with reference to exemplary embodiments illustrated in the accompanying drawings, which show in:

FIG. 1 a device according to the invention for changing properties of at least one liquid medium in a first embodiment, FIG. 2 a device according to the invention for changing properties of at least one liquid medium in a second embodiment.

Common to both embodiments is a vessel 2, into which a sonotrode 3 protrudes or which operatively communicates with a sonotrode 3 so that ultrasound generated by the resonator 4 can be introduced via the sonotrode 3 into the vessel 2 and thus into a liquid medium in the vessel 2. At least one property of the liquid medium in the vessel 2 can be changed by the ultrasound.

A line 5 is connected to an inlet and/or to an outlet of the vessel 2 in the flow direction 10 upstream of the vessel 2 as well as downstream of the vessel 2. For conveying the liquid medium into the vessel 2, a pump 1 is provided on the line 5 connected upstream of the vessel 2.

In the embodiment according to FIG. 1, the device according to the invention includes a pinch valve 6 arranged in the line 5 downstream of the vessel 2, with which the cross section of this line 5 can be reduced or completely closed.

In the embodiment according to FIG. 2, the device in the line 5 connected upstream of the vessel 2 as well as in the line 5 connected downstream of the vessel 2 each includes a pinch valve 6.

The volume or mass flow of the liquid medium into the vessel can be adjusted with the illustrated pinch valves. In addition, the internal pressure in the vessel 2 can be adjusted with the pinch valves. Due to the short control times for operating pinch valves, a desired volume flow or a desired internal vessel pressure in the vessel 2 can be produced within a very short time, allowing a reaction to different adjusted parameters in the vessel 2 and/or to different ultrasonic parameters in a simple and convenient way in order to achieve an optimum result with regard to the change in properties of the liquid medium.

LIST OF REFERENCE SYMBOLS

Pump 1
Vessel 2
Sonotrode 3
Resonator 4
Line 5
Pinch valve 6
Flow direction 10

The invention claimed is:

1. A method for changing a property of at least one liquid medium, comprising:
   exposing the at least one liquid medium contained in at least one vessel to ultrasonic oscillations in a low-frequency high-power ultrasound range, and
   regulating at least one of a flow velocity of the at least one liquid medium in the at least one vessel in which the at least one liquid medium is contained for exposure to ultrasound and an internal pressure of the at least one vessel by varying with at least one pinch valve a cross-section of at least one of a line located upstream of an inlet of the at least one vessel in a flow direction and a line located downstream of an outlet of the at least one vessel, wherein
   the at least one pinch valve is pneumatically or hydraulically controlled and a constant control pressure is applied to the at least one pinch valve.

2. The method according to claim 1, wherein the exposure to ultrasound occurs at a pressure in the at least one liquid medium that is different from ambient pressure.

3. The method according to claim 1, wherein the cross-section of the at least one line is varied with the at least one pinch valve during ultrasonic operation.

4. The method according to claim 1, wherein the line cross-section of the at least one line is varied as a function of an ultrasonic parameter.

5. The method according to claim 4, wherein the ultrasonic parameter includes ultrasonic power.

6. The method according to claim 1, wherein the ultrasound has a frequency between 15 and 40 kHz.

7. The method according to claim 1, wherein the ultrasound has an ultrasonic power between 50 W and 20,000 W.

8. The method according to claim 1, wherein the ultrasonic oscillations have a maximum amplitude greater than 1 µm (peak-peak).

* * * * *